US010931669B2

(12) United States Patent
Coleman et al.

(10) Patent No.: US 10,931,669 B2
(45) Date of Patent: Feb. 23, 2021

(54) ENDPOINT PROTECTION AND AUTHENTICATION

(71) Applicant: L3 Technologies, Inc., New York, NY (US)

(72) Inventors: Glenn Coleman, Berwyn, PA (US);
Peter Martz, Marlton, NJ (US);
Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 196 days.

(21) Appl. No.: 16/142,810

(22) Filed: Sep. 26, 2018

(65) Prior Publication Data

US 2019/0098007 A1 Mar. 28, 2019

Related U.S. Application Data

(60) Provisional application No. 62/564,680, filed on Sep. 28, 2017.

(51) Int. Cl.
*H04L 29/06* (2006.01)
*G06F 21/44* (2013.01)
*G06F 21/53* (2013.01)

(52) U.S. Cl.
CPC .......... *H04L 63/0876* (2013.01); *G06F 21/44* (2013.01); *G06F 21/53* (2013.01);
(Continued)

(58) Field of Classification Search
CPC ... H04L 63/0876; H04L 63/08; H04L 63/107; H04L 63/20; H04L 63/0218;
(Continued)

(56) References Cited

U.S. PATENT DOCUMENTS 7,478,330 B1 1/2009 Branson et al.
7,698,442 B1 4/2010 Krishnamurthy et al.
(Continued)

FOREIGN PATENT DOCUMENTS

RU 2406138 C1 12/2010

OTHER PUBLICATIONS

Computing the real isolated points of an algebraic hypersurface Huu Phuoc, Mohab Safey El Din, Timo de Wolff ISSAC '20: Proceedings of the 45th International Symposium on Symbolicand Algebraic Computation. Jul. 2020, pp. 297-304 (Year: 2020).*
(Continued)

*Primary Examiner* — Kambiz Zand
*Assistant Examiner* — Mohammad S Shams
(74) *Attorney, Agent, or Firm* — Condo Roccia Koptiw LLP

(57) ABSTRACT

Methods and systems are disclosed for endpoint protection and authentication schemes for a host computer system having an internet isolation system. A first host computer system may include a first memory space and a second memory space. The first memory space may be configured to enable storage and operation of a workspace configured to execute a first set of one or more applications and processes running on an operating system of the first host computer system. The second memory space may be configured to enable storage and operation of a second set of one or more applications and processes associated with an isolated computing environment (e.g., a sandboxed computing environment) configured to run on the operating system. When the first host computer system is connected to a network that is known or associated with a predetermined security policy, the first host computer system may instantiate a predetermined security policy configuration.

20 Claims, 3 Drawing Sheets

(52) U.S. Cl.
CPC ............ *H04L 63/08* (2013.01); *H04L 63/107* (2013.01); *H04L 63/20* (2013.01); *H04L 63/0218* (2013.01); *H04L 63/0227* (2013.01); *H04L 63/205* (2013.01)

(58) Field of Classification Search
CPC ... H04L 63/0227; H04L 63/205; G06F 21/44; G06F 21/53
USPC .......................................................... 726/1
See application file for complete search history.

(56) References Cited

U.S. PATENT DOCUMENTS

| | | | |
|---|---|---|---|
| 7,805,516 B2 | 9/2010 | Kettler et al. | |
| 7,870,153 B2* | 1/2011 | Croft | G06F 3/1415 707/781 |
| 8,090,797 B2* | 1/2012 | Chinta | G06F 21/53 709/203 |
| 8,613,070 B1* | 12/2013 | Borzycki | H04L 67/10 726/8 |
| 9,680,873 B1* | 6/2017 | Halls | H04L 63/0869 |
| 9,921,860 B1* | 3/2018 | Banga | G06F 9/445 |
| 10,055,231 B1* | 8/2018 | Li | G06F 9/45558 |
| 10,122,703 B2* | 11/2018 | Innes | H04L 9/3263 |
| 2002/0023212 A1* | 2/2002 | Proudler | G06F 11/3476 713/164 |
| 2002/0069369 A1 | 6/2002 | Tremain et al. | |
| 2006/0070066 A1 | 3/2006 | Grobman | |
| 2007/0220187 A1 | 9/2007 | Kates | |
| 2007/0260873 A1 | 11/2007 | Hatfalvi et al. | |
| 2008/0028401 A1 | 1/2008 | Geisinger | |
| 2008/0201711 A1 | 8/2008 | Amir Husain | |
| 2008/0256536 A1 | 10/2008 | Zhao et al. | |
| 2009/0164994 A1* | 6/2009 | Vasilevsky | G06F 9/45533 718/1 |
| 2009/0172781 A1 | 7/2009 | Masuoka et al. | |
| 2009/0328038 A1 | 12/2009 | Yamada et al. | |
| 2010/0138829 A1 | 6/2010 | Hanquez et al. | |
| 2010/0138830 A1 | 6/2010 | Astete et al. | |
| 2010/0223613 A1 | 9/2010 | Schneider | |
| 2010/0251329 A1 | 9/2010 | Wei | |
| 2012/0017213 A1* | 1/2012 | Hunt | G06F 21/53 718/100 |
| 2012/0023593 A1 | 1/2012 | Puder et al. | |
| 2012/0265976 A1* | 10/2012 | Spiers | G06F 9/45533 713/2 |
| 2014/0059642 A1* | 2/2014 | Deasy | H04L 63/20 726/1 |
| 2017/0353496 A1* | 12/2017 | Pai | H04L 12/4641 |
| 2017/0359309 A1* | 12/2017 | Bolte | H04W 12/08 |
| 2018/0196945 A1* | 7/2018 | Kornegay | G06F 21/6218 |
| 2018/0234422 A1* | 8/2018 | Odom | H04L 63/08 |
| 2018/0367528 A1* | 12/2018 | Schwarz | H04L 63/08 |

OTHER PUBLICATIONS

"Georgia computes!" : improving the computing education pipeline Amy Bruckman, Maureen Biggers, Barbara Ericson, Tom McKlin, Jill Dimond, Betsy DiSalvo, Mike Hewner, Lijun Ni, Sarita Yardi SIGCSE '09: Proceedings of the 40th ACM technical symposium on Computer scince education. Mar. 2009, pp. 86-90 (Year: 2009).*
Barnet, Mark, "Praktikum Po Zaschite Seti Kompanii", Windows IT Pro/RE, Nov.-Dec. 2006, pp. 79-81.
Burnett, Mark, "How I Secured One Company's Network", Using Log Parser, Virtualization, and a Little Psychology, Sep. 17, 2006, 4 pages.
Laverick, Mike, "Hypervisor Management and Optimization for Advanced Virtualization", E-book, TechTarget, 2010, 13 pages.
Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at <https://en.wikipedia.org/wiki/Hypervisor> , retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at <https://en.wikipedia.org/wiki/Multiprotocol_Label_Switching> , retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.

* cited by examiner

| HOST SYSTEM LOCATION | TERMINATION DEVICE LOCATION | AUTHENTICATION METHOD(S) |
|---|---|---|
| TRUSTED NETWORK | TRUSTED NETWORK (LAN/WAN) | LEVEL 1 – NTLM, KERBEROS, U/P, TFA, CERTIFICATES, KEYS |
| TRUSTED NETWORK | UNTRUSTED NETWORK (CLOUD) | LEVEL 2 – TFA, CERTIFICATES, KEYS |
| UNTRUSTED NETWORK | TRUSTED NETWORK (LAN/WAN) | LEVEL 3 – TFA, CERTIFICATES |
| UNTRUSTED NETWORK | UNTRUSTED NETWORK (CLOUD) | LEVEL 4 – TFA |

ENDPOINT PROTECTION AND AUTHENTICATION

CROSS-REFERENCE TO RELATED APPLICATION

This application claims the benefit of U.S. Provisional Application Ser. No. 62/564,680 filed Sep. 28, 2017, the contents of which are incorporated by reference herein.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware.

The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system.

SUMMARY OF THE INVENTION

Methods and systems are disclosed for endpoint protection and authentication schemes for a host computer and/or a host computer system having an internet isolation system. A first host computer system may include a processor and a memory. The first host computer system may include a first memory space and a second memory space. The first memory space may be configured to enable storage and operation of a workspace configured to execute a first set of one or more applications and processes running on an operating system of the first host computer system.

The second memory space may be configured to enable storage and operation of a second set of one or more applications and processes associated with an isolated computing environment configured to run on the operating system. An isolated computing environment described herein may include, but not limited to, a sandboxed computing environment, a virtual machine computing environment, a hybrid of a sandboxed computing environment and a virtual machine computing environment, and/or the like. The second set of one or more applications and processes may be configured to run a first software application. The first software application may interact with one or more untrusted network destinations. The first software application may be a collaboration software application, for example. The first sandboxed computing environment may be enforced via a first sandbox container process. The first sandbox container process may segregate the workspace associated with the first memory space from the first sandboxed computing environment associated with the second memory space. The first sandbox container process may be configured to prevent data from being communicated between the sandboxed computing environment and the workspace without an explicit user input.

The first host computer system may include a first firewall. The first firewall may be configured to operate between the workspace of the first memory space and a network. The first firewall may be configured to prevent unauthorized communication between the first set of one or more applications and processes and one or more untrusted network destinations. The first host computer system may be configured to connect to a trusted network and/or an untrusted network. The first firewall may be configured based on whether the first host computer system is connected to the trusted network or the untrusted network.

The first host computer system may determine whether a connected network is known or associated with a predetermined security policy. The connected network may be the network to which the first host computer system is connected. When the connected network is determined to be known and/or associated with the predetermined security policy, the first host computer system may instantiate the predetermined security policy configuration, for example, that is associated with the connected network. The predetermined security policy configuration may include a specific authentication mechanism and/or a specific encryption scheme. The first host computer system may be configured to determine whether a connected network is known and/or trusted or untrusted based on one or more of connectivity with a specific device or multiple devices, a unique local area network addressing, and/or other network identification techniques.

The first host computer system may include a second firewall. The second firewall may be configured to operate between the first sandboxed computing environment and the workspace. The second firewall may be configured to enforce separation of the first memory space and the second memory space. The first host computer system may be configured to enable a third memory space. The third memory space may be configured to enable storage and operation of a third set of one or more applications and processes associated with a second sandboxed computing environment configured to run on the operating system. The third set of one or more applications and processes may be configured to run a second software application. The second software application may be a browser application, for example. The second sandboxed computing environment may be enforced via a second sandbox container process.

The second container process may segregate the workspace associated with the first memory space from the second sandboxed computing environment associated with the third memory space. The second sandbox container process may be configured to prevent data from being communicated between the second sandboxed computing environment and the workspace, for example, without an explicit user input.

The second sandbox container process may be configured to determine if a process operating in the workspace is attempting to access a trusted network destination or an untrusted network destination. When the process is attempting to access an untrusted network destination, the second sandbox container process may be configured to spawn an instance of the process in the second sandboxed computing environment, for example, to access the untrusted network destination. The second sandbox container process may be configured to determine if a process operating within the second sandboxed computing environment is attempting to access a trusted network destination or an untrusted network destination. When the process is attempting to access a trusted network destination, the second sandbox container process may be configured to spawn an instance of the process in the workspace, for example, to access the trusted network destination.

The first and/or second sandbox container processes may be configured to authenticate with one or more intermediate devices. For example, the first and/or second sandbox container processes may authenticate with the one or more intermediate devices using one or more credentials stored in a configuration file. The configuration file may be associated with the first and/or second sandbox container processes. The one or more intermediate devices may include a termination device and/or a proxy device (e.g., such as a network-based web proxy, an internet-based web proxy, and/or the like). Upon authenticating with the one or more intermediate devices the second and/or third set of applications and/or processes operating within the first and/or second sandboxed computing environments may be allowed to access one or more specific resources via the one or more intermediate devices.

A host computer may include a processor and a memory. The host computer may include a first memory space and a second memory space. The first memory space may be configured to enable storage and operation of a workspace configured to execute a first set of one or more applications and processes running on an operating system of the host computer. The second memory space may be configured to enable storage and operation of a second set of one or more applications and processes associated with an isolated computing environment configured to run on the operating system. The isolated computing environment may include and/or may be refer to a sandboxed computing environment.

The host computer may be configured to isolate the isolated computing environment from the workspace using a firewall (e.g., an internal isolation firewall). The host computer may be configured to process communications exchanged between the host computer and a network to which the host computer is connected using a host-based firewall. The host-based firewall may be configured to implement a first policy for communications associated with the isolated computing environment and a second policy for communications associated with the workspace. The second policy may be dependent on a relative location of the host computer. In examples, the second policy may allow at least one outgoing communication from the first set of one or more applications associated with the workspace to the network on condition that the network is determined to be a predetermined trusted network. In examples, the second policy may block at least one outgoing communication from the first set of one or more applications associated with the workspace to the network on a condition that the network is determined not to be the predetermined trusted network.

The host computer may be configured to determine a relative location of the host computer. The relative location of the host computer may be determined based on whether the network that the host computer is connected to is a predetermined trusted network.

Based on the determined relative location of the host computer, the host computer may be configured to select an authentication procedure for authenticating the isolated computing environment with at least one server. The authentication procedure may include a first authentication procedure and a second authentication procedure. The first authentication procedure may be is selected if the network is a predetermined trusted network. The second authentication procedure may be selected if the network is not the predetermined trusted network. The first and/or the second authentication procedure may utilize one or more of user-name/password authentication, a NT LAN manager (NTLM) authentication, a KERBEROS authentication, a certificate-based authentication, a shared keys authentication, a two-factor authentication (TFA), a biometric authentication, a behavioral authentication, a secure socket layer (SSL) authentication, or a MAC address authentication. In examples, the first authentication procedure may differ from the second authentication procedure. In examples, the first authentication procedure may be the same as the second authentication procedure.

The host computer may be configured to authenticate the isolated computing environment with the at least one server in accordance with the selected authentication procedure. The at least one server may be accessed using a first network address when using the first authentication procedure. The at least one server may be accessed using a second network address when using the second authentication procedure. In examples, the first and the second network addresses may share the same network address. In examples, the first and the second network address may have different network addresses.

BRIEF DESCRIPTION OF THE DRAWINGS

FIG. 3 depicts an example authentication matrix.

DETAILED DESCRIPTION

Figure 1:
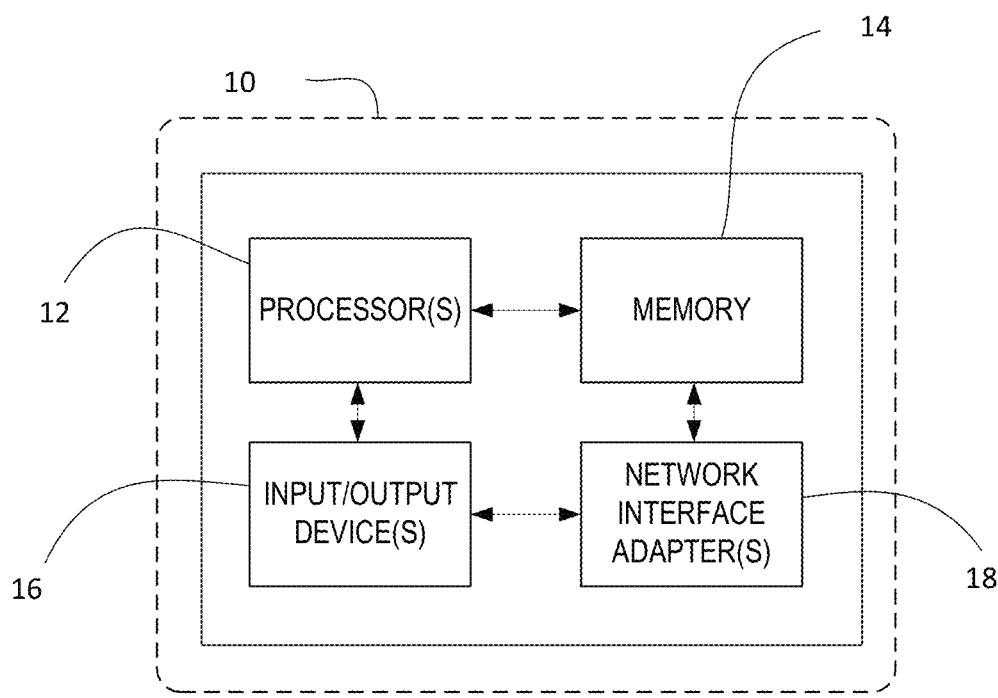
FIG. 1 depicts an example host computer system.

Methods and systems are disclosed for endpoint protection and authentication schemes for a host computer and/or a host computer system having an internet isolation system. The internet isolation system may include one or more segregated memory spaces, a monitoring process, one or more internal isolation firewalls, an automated authentication mechanism, a host-based firewall, an antivirus capability, a location awareness capability, and/or a browser switching function. The internet isolation system may be implemented as a single application and/or application suite. For example, the internet isolation system may be an endpoint protection scheme configured to protect one or more host computer systems and the network to which the host computer systems are connected.

The host computer system may include use of an authentication mechanism with an intermediate device. The intermediate device may be a web proxy, a termination device, another proxy device, and/or the like. The host computer system may use an encryption scheme to authenticate with the intermediate device. The internet isolation system may enable multiple authentication and/or encryption schemes.

A host computer system may be configured to dynamically modify the security policy and/or authentication mechanism. For example, the host computer system may dynamically modify the security policy and/or authentication mechanism based on a level of protection required, a location of the host computer system, a location of an intermediate device (e.g., such as a web proxy), a type of communication (e.g., such as web-based protocols, file transfers, etc.), and/or the operating system (e.g., such as Windows-based, Mac-based, Linux-based, and/or the like) of the host computer system.

The host computer system may include a location awareness capability. The location awareness capability may enable the host computer system to determine whether it is connected to a trusted network or an untrusted network. The host computer system may be configured to dynamically adjust the security policy and/or the authentication mechanism based on whether the host computer system is connected to a trusted network or an untrusted network. For example, the host computer system may use a first security policy when connected to a trusted network and a second security policy when connected to an untrusted network. The host computer system may determine whether a connected network is known and/or associated with a predetermined security policy. When the connected network is known and/or associated with a predetermined security policy, the host computer system may enable a predetermined security policy configuration, for example, associated with the connected network. When the connected network is unknown, the host computer system may enable a default security policy configuration. A security policy configuration may include one or more of a specific authentication mechanism, a specific encryption scheme, a definition of one or more intermediary devices (e.g., such as a web proxy), a host based firewall policy, and/or the like.

When the internet isolation system is implemented as a single application and/or application suite, the common software base may result in improved performance for the host computer system, improved interaction between the features of the internet isolation system, a simplified implementation, a simplified administration and/or configuration, a simplified licensing, a simplified support, and/or more secure communication between devices within the host computer system's network.

The host computer system may be configured to implement network isolation between one or more untrusted network destinations and the host computer system. The network isolation may be implemented via one or more of a host-based firewall on the host computer system, a border firewall around a portion of the trusted network that includes the host computer system, a web proxy, an internal isolation firewall on the host computer system, and/or a segregation of a trusted memory space and an untrusted memory space.

Internet isolation, which may be referred to herein as communication isolation, may be provided via untrusted memory space segregation. The host computer system may have a sandbox protected application or process and/or an internal isolation firewall running thereon. For example, collaboration software may wholly or partially be contained in a sandboxed computing environment. As another example, a collaboration software application may instantiate its own sandboxed computing environment, firewall, and/or untrusted memory space. The host computer system may enable use of collaboration software via a web browser and/or a specific collaboration software application. For example, one or more plugins may installed in a web browser to enable use of the collaboration software. Other isolation methods such as operating the collaboration software applications within a virtual machine may be used.

Sandbox protected application(s) or process(es) may operate within a sandboxed computing environment. The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace and/or any other memory space of the host computer system. The sandboxed container process may be configured to enable one or more applications and/or processes (e.g., such as a collaboration software application and/or process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace and/or any other memory space.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to access untrusted network destinations via an access connection device. The access connection device may be a web proxy, for example. The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

Communication isolation may be provided via a host-based firewall. The host-based firewall may be configured to prevent unauthorized communication between applications and/or processes operating in the workspace of the host computer system to other devices on the network over which the host computer is communicating. The host-based firewall may be configured to block incoming communications to the workspace of the host computer system, except for predetermined trusted devices and/or predetermined network ports. The host-based firewall may allow outgoing communications to be sent from a process in the workspace to a trusted network destination (e.g., trusted LAN destination).

Communication isolation may be provided via an internal isolation firewall. The internal isolation firewall may enable separation between the sandboxed computing environment and the workspace. The applications and/or processes operating within the sandboxed computing environment may be prevented from access any additional resources of the host computer system or may be prevented from access any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may allow certain actions to be performed with approval of the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
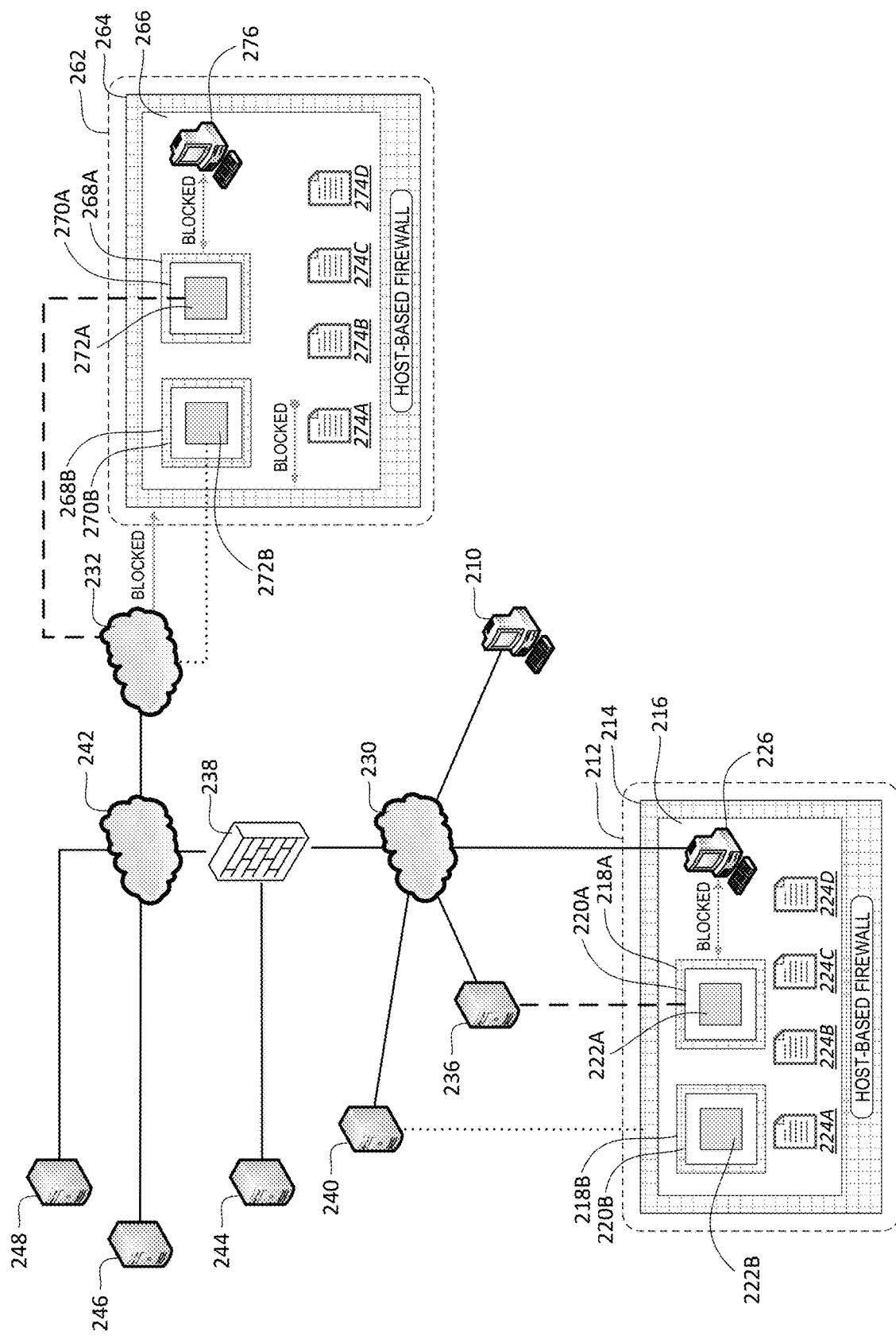
FIG. 2 depicts an example host computer system connected to a trusted network and another example host computer system connected to an untrusted network, the example host computer systems using a sandbox based network isolation system.

FIG. 2 depicts an example host computer system 212 connected to a trusted network 230 and another example host computer system 262 connected to an untrusted network 232. The trusted network 230 may include a plurality of physical and/or virtual devices. The trusted network 230 may include a plurality of host computer systems. The untrusted network 232 may be another local network, a public Wi-Fi network, a cellular network, a satellite network, and/or the like.

The host computer system 212 may transmit electrical data signals to one or more other host computer systems (e.g., such as host computer system 210). Each of the host computer systems on the trusted network 230 may be identified by a unique local area network address. The trusted network 230 may include a router (not shown), a border firewall 238, a network-based web proxy 236, and/or a termination device 240. The host computer system 212 may send web traffic (e.g., to one or more trusted URLs) and/or non-web traffic to the trusted network 230 via the operating system 226. The host computer system 212 may send web traffic to one or more untrusted network destinations (e.g., untrusted URLs) using one or more of the border firewall 238, the network-based web proxy 236, a termination device 240, a WAN-based web proxy 244, a first internet-based web proxy 246, and/or an intermediate proxy device 248 (e.g., such as a second internet-based web proxy). For example, the host computer system 212 may access the internet 242 and/or a device on the internet 242 via the trusted network 230, the border firewall 238, the network-based web proxy 236, the termination device 240, the WAN-based web proxy 244, the first internet-based web proxy 246, and/or the intermediate proxy device 248.

The host computer systems 212 may include a sandbox-based internet isolation system. For example, the host computer system 212 may include one or more sandboxed computing environments (e.g., such as sandboxed computing environments 220A, 220B). The sandboxed computing environments 220A, 220B may be untrusted portions operating on the host computer system 212. The host computer system 212 may include an anti-virus capability 224A, a process monitoring capability 224B, a document isolation capability 224C, and/or a malware Entrapt capability 224D. For example, the sandbox-based internet isolation system may include the anti-virus capability 224A, the process monitoring capability 224B, the document isolation capability 224C, and the malware Entrapt capability 224D, for example, in a single application and/or application suite.

The anti-virus capability 224A may be configured to prevent, detect, and/or remove malware from the host computer system 212. The anti-virus capability 224A may be based on one or more of signatures, machine learning, or behavioral learning (e.g., user and/or machine). For example, the anti-virus capability 224A may be configured to determine if a process and/or application operating on the host computer system 212 is harmful, malicious, and/or unauthorized based on predefined criteria (e.g., information) about process and/or application activity. As another example, the anti-virus capability 224A may analyze operation of the host computer system 212 and may modify (e.g., automatically) criteria used to determine if a process and/or application is harmful, malicious, and/or unauthorized. As another example, the anti-virus capability 224A may analyze interaction between the host computer system 212 and one or more users and may modify (e.g., automatically) criteria used to determine if a process and/or application is harmful, malicious, and/or unauthorized. The anti-virus capability 224A may modify the criteria based on the analysis of the operation of the host computer system 212 and/or based on the analysis of the interaction between the host computer system 212 and the one or more users. The criteria may be located locally to the host computer system 212, for example, within the workspace 216. The criteria may be located remotely to the host computer system 212. The criteria may be modified and/or updated periodically and/or by user request. The criteria may be modified based on data from the host computer system 212, user interaction, a separate computing device (e.g., such as a server), and/or a subscription methodology.

The process monitoring capability 224B may be configured to ensure that processes operating on the host computer system 212 are running and/or performing as intended. For example, the process monitoring capability 224B may be configured to monitor the sandboxed computing environments 220A, 220B and/or the respective sandbox container processes. The process monitoring capability 224B may be configured to restore the sandbox container processes to known good versions. The process monitoring capability 224B may be configured to restore the sandbox container processes based on one or more of a user input, an application input, detection of an abnormality in the sandbox container process, or expiration of predetermined period of time (e.g., a timer-based refresh mechanism).

The document isolation capability 224C may be configured to isolate sensitive, confidential, and/or proprietary data on the host computer system 212. The document isolation capability 224C may include access to specific file types (e.g., regardless of file content—trusted or untrusted). Access to the sensitive, confidential, proprietary data, and/or configured file types may be isolated to a trusted environment of the host computer system 212. The trusted environment may be the operating system 226 and/or the workspace 216 of the host computer system 212. The document isolation capability 224C may be provided via untrusted memory space segregation.

The Entrapt capability 224D may be configured to use a sandbox internet isolation system to limit and/or segregate security threats. For example, the Entrapt capability 224D may include one or more isolated and segregate memory spaces (e.g., such as sandboxed computing environments 220A, 220B), one or more software based firewalls (e.g., such as internal isolation firewalls 218A, 218B), and/or browser switching.

The trusted network 230 may be connected to the Internet 242 via a border firewall 238. The border firewall 238 may be configured to block communication between one or more devices on the trusted network 230 and one or more untrusted network destinations. The border firewall 238 may have one or more exceptions. For example, one or more predetermined devices and/or applications may bypass the border firewall 238, for example, using a predetermined set of protocols. The one or more devices on the trusted network 230 may include one or more electronic mail servers (not shown), one or more domain name service servers (not shown), a proxy/web-content filter (not shown), a secure file transfer server (not shown), a central monitoring security system (not shown), and/or any other service providing devices. Communication between the one or more devices and the Internet 242 may utilize one or more protocols required for the proper functioning of said devices.

The host computer system 212 may include a host-based firewall 214, an operating system 226, a first sandboxed computing environment 220A, a second sandboxed computing environment 220B, a first internal isolation firewall 218A, a second internal isolation firewall 218B, and a workspace 216. The host computer system 212 may be any host computer system, such as a personal computer (PC), a laptop, a virtual machine, and/or any of a variety of other host computer systems operatively connected with one or more user-accessible data entry devices, a display device viewable by a user, and a computer-accessible data storage. One or more application programs may run on the operating system 226.

As an example, the host computer system 212 may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to the software (e.g., computer-readable instructions) stored on the host computer system 212 for common operation. Software programs may include word processing programs, accounting programs, remote connectivity programs, and/or other types of applications.

Each of the sandboxed computing environments 220A, 220B may include resources (e.g., a limited set of resources) allocated to operation of respective sandbox container processes. For example, the first sandboxed computing environment 220A may be enforced via a first sandbox container process and the second sandboxed computing environment 220B may be enforced via a second sandbox container process. The first and second sandbox container processes may be security mechanisms used to separate resources associated with the respective sandboxed computing environments 220A, 220B from other applications and/or processes that may be running on the workspace 216 or other memory spaces of the host computer system 212. The first and second sandbox container processes may include security mechanisms used to separate resources associated with the sandboxed computing environments 220A and applications and/or processes that may be running within sandboxed computing environment 220B (e.g., and vice versa). The sandboxed container processes may be configured to enable one or more applications and/or processes (e.g., such as a browser process, collaboration software, etc.) being executed within the respective sandboxed computing environments 220A, 220B to access the resources allocated for operation of the sandbox container processes. For example, the one or more applications and/or processes being operated within the first sandboxed computing environment 220A may be allowed to access memory associated with the first sandboxed computing environment 220A and one or more applications and/or processes being operated within the second sandboxed computing environment 220B may be allowed to access memory associated with the second sandboxed computing environment 220B. The memory associated with the first sandboxed computing environment 220A may be separate from memory that is configured to enable storage and operation of the workspace 216. The memory associated with the second sandboxed computing environment 220B may be separate from the memory that is configured to enable storage and operation of the workspace 216. The memory associated with the first sandboxed computing environment 220A may be separate from memory that is configured to enable storage and operation of the second sandboxed computing environment 220B.

The workspace 216 may include one or more processes operating within the operating system 226 that are not restricted by the first and second sandbox container processes. The operating system 226 of the host computer system may include a set of resources configured to enable operation of the workspace 216, the first sandbox container process, and/or the second sandbox container process.

The host computer system 212 may enable the host-based firewall 214. The host-based firewall 214 may prohibit communication (e.g., direct communication) between the host computer system 212 and other devices on the trusted network 230. For example, the host-based firewall 214 may be configured to block incoming traffic to the trusted host computer system 212, except for traffic received via one or more predetermined devices and/or ports. One or more devices (e.g., predetermined devices) on the trusted network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The host computer system 212 may enable the first sandboxed computing environment 220A and the second sandboxed computing environment 220B, for example, using the first and second sandbox container processes. The sandbox container processes may run within the operating system 226 of the host computer system 212. A first memory space may be configured to enable storage and operation of the workspace 216 configured to execute a first set of one or more applications and/or processes running on the operating system 226 of the host computer system 212. A second memory space, configured to enable storage and operation of a set of one or more applications and/or processes operating within the first sandboxed computing environment 220A, may be prohibited from communicating with other resources within the trusted network 230. A third memory space, configured to enable storage and operation of a set of one or more applications and/or processes operating within the second sandboxed computing environment 220B, may be prohibited from communicating with other resources within the trusted network 230. A browser process 222A (e.g., a sandboxed browser process) may run within the first sandboxed computing environment 220A. The browser process 222A may be configured to enable access to untrusted network destinations. A collaboration software application 222B may run within the second sandboxed computing environment 220B. The collaboration software application 222B may be configured to enable interaction between the host computer system 212 and one or more remote host computer systems (e.g., such as host computer system 262), for example, during a web-based meeting.

Browser solutions running within the workspace 216 of the host computer system 212 may be utilized for communication between the host computer system 212 and trusted network destinations. For example, browser processes running within the workspace 216 of the host computer system 212 may enable access to the trusted network destinations.

The sandboxed computing environments 220A, 220B and/or the sandbox container processes may be implemented using software and/or hardware. For example, the sandboxed computing environments 220A, 220B and/or the sandbox container processes may be implemented using software that is commercially available, for example, such as Invincea Endpoint Protection, Tanium Endpoint Platform, Bromium Advanced Endpoint Security, etc.

The first sandbox container process may segregate the workspace 216 from the first sandboxed computing environment 220A. The first memory space (e.g., the workspace memory) may enable storage and/or operation of the workspace 216. The operating system 226 may enable operation of the first sandboxed computing environment 220A. The second memory space may enable storage and/or operation of one or more applications and/or processes associated with the first sandboxed computing environment 220A. For example, the second memory space may be reserved for storage and/or operation of the applications and/or processes running within the first sandboxed computing environment 220A. The first sandbox container process may isolate the second memory space from the first memory space and/or any other memory spaces. For example, the first sandbox container process may enable the first internal isolation firewall 218A. The first internal isolation firewall 218A may enforce a separation of the first and second memory spaces. For example, the first internal isolation firewall 218A may allow a predefined set of processes to be executed within the first sandboxed computing environment 220A. The first internal isolation firewall 218A may prevent execution, in the first sandboxed computing environment 220A, of any processes outside of the predefined set of processes. The second memory space may be referred to as a separate and/or isolated memory space. The first sandbox container process may segregate to the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory.

A third memory space may enable storage and/or operation of one or more applications and/or processes associated with the second sandboxed computing environment 220B. For example, the third memory space may be reserved for storage and/or operation of the applications and/or processes running within the second sandboxed computing environment 220B. The second sandbox container process may isolate the third memory space from the first memory space and/or any other memory spaces (e.g., the second memory space). For example, the second sandbox container process may enable the second internal isolation firewall 218B. The second internal isolation firewall 218B may enforce a separation of the first and third memory spaces. For example, the second internal isolation firewall 218B may allow a predefined set of processes to be executed within the second sandboxed computing environment 220B. The second internal isolation firewall 218B may prevent execution, in the second sandboxed computing environment 220B, of any processes outside of the predefined set of processes. The third memory space may be referred to as a separate and/or isolated memory space. The second sandbox container process may segregate to the third memory space, any additional processes and/or memory usage required for interaction with meeting related content (e.g., data) during an established communication session with one or more trusted or untrusted host computer systems. The first, second, and/or third memory spaces may be separate physical memory locations. The first, second, and/or third memory spaces may be collocated on a physical memory.

The second and third memory spaces and the processes therein, may have limited access to the resources, assets, and/or files of the remainder of the computer-accessible data storage or memory space of the host computer system 212. Data transfers between the sandboxed computing environments 220A, 220B and the workspace 216 of the host computer system 212 may be restricted to set transfer types. Data transfers between the sandboxed computing environments 220A, 220B may be restricted to set transfer types. The set transfer types may be configured to minimize the possibility of malicious data migrating between the sandboxed computing environments 220A, 220B and/or from the sandboxed computing environments 220A, 220B to the workspace 216 of the host computer system 212. The sandboxed computing environments 220A, 220B may transfer (e.g., only transfer) data to or from the workspace 216 of the host computer system 212 in response to a user input directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

The operating system 226 may access (e.g., only access) the second memory space associated with the first sandboxed computing environment 220A and/or the third memory space associated with the second sandboxed computing environment 220B as required for the proper operation of each respective sandboxed computing environment. Each of the internal isolation firewalls 218A, 218B may be built-in with the respective sandboxed computing environments 220A, 220B.

The first sandboxed computing environment 220A, when activated, may enable communication (e.g., indirect communication) between the host computer system 212 and an untrusted network destination via the network-based web proxy 236. The first sandboxed computing environment 220A may be activated via a desktop shortcut and/or one or more predetermined applications on the operating system 226 of the host computer system 212.

As an example, an application short cut located on the user's desktop space, the desktop toolbar, and/or the standard program Start screen may be activated, for example, by a user selection. The first sandbox container process may detect when a browser program is selected for activation. When the browser program is activated, the first sandbox container process may terminate one or more running browser program processes and/or may activate the browser process 222A within the first sandboxed computing environment 220A, as described herein.

The browser process 222A, when activated by the first sandbox container process, may initiate a communication session to a proxy device (e.g., the network-based web proxy 236). For example, the communication session may be initiated utilizing an encrypted protocol on a predetermined network port. During the initiation of the communication session, the first sandboxed computing environment 220A may validate the authenticity of a sandbox browser process request for the communication session. The first sandboxed computing environment 220A may authenticate the browser process 222A using an authentication mechanism with the proxy device. If the sandboxed browser process request fails authentication, the communication session may be terminated, for example, by the proxy device.

The first sandbox container process may initiate a communication session with the proxy device using an authentication mechanism. For example, the authentication procedure may use a predetermined protocol and may communicate with the proxy device using a predetermined communication port. As another example, the authentication procedure may be performed dynamically. For example, the authentication procedure used may depend on the network that the host computer system 212 is connected and/or the network that the proxy device is connected. As an example, the first sandbox container process may initiate the browser process 222A and the communication session with the proxy device (e.g., the network-based web proxy 236) using an NT LAN Manager (NTLM) and the predetermined network port 2222. As another example, the first sandbox container process may initiate the communication session with the proxy device using a Secure Socket Layer (SSL) and the predetermined network port 2222. As part of the communication session, the first sandboxed computing environment 220A may send validation credentials to the proxy device (e.g., the network-based web proxy 236), for example, using a predetermined authentication mechanism. The predetermined authentication mechanism may be a username/password combination. The username/password combination may be encrypted, for example, with an asymmetric or a symmetric encryption key system. The proxy device (e.g., the network-based web proxy 236) may be the only device able to decrypt the username/password combination.

The first sandbox container process may be configured to authenticate with the proxy device. For example, the first sandbox container process may authenticate with the proxy device on behalf of the browser process 222A. The first sandbox container process may authenticate with the proxy device using credentials stored in a configuration file. The configuration file may be encrypted. For example, the first sandbox container process may be configured to read only encrypted configuration files.

Upon successful creation of a communication session between the first sandboxed computing environment 220A and the proxy device, the proxy device may analyze and/or validate the request to communicate with the untrusted network destination. If the request to communicate with the untrusted network destination is permitted, the proxy device may act as an intermediary communication point between the first sandboxed computing environment 220A and the untrusted network destination.

The second sandboxed computing environment 220B, when activated, may enable communication (e.g., direct or indirect communication) between the host computer system 212 and one or more trusted or untrusted devices via the termination device 240. The communication between the host computer system 212 and another device via the termination device 240 may be established via a peer to peer meeting. The second sandboxed computing environment 220B may be activated via a desktop shortcut, a web browser, and/or one or more predetermined applications on the operating system 226 of the host computer system 212.

As an example, a collaboration software application short cut located on the user's desktop space, the desktop toolbar, and/or the standard program Start screen may be activated, for example, by a user selection. As another example, the collaboration software application may be accessed via a web browser and/or a URL address. The second sandbox container process may detect when the collaboration software application 222B is selected for activation. When the collaboration software application 222B is activated, the second sandbox container process may activate the collaboration software application 222B within the second sandboxed computing environment 220B, as described herein.

The collaboration software application 222B, when activated by the second sandbox container process, may initiate a communication session with the termination device 240. For example, the communication session may be initiated utilizing an encrypted protocol on a predetermined network port. During the initiation of the communication session, the second sandboxed computing environment 220B may validate the authenticity of a request for the communication session. The second sandboxed computing environment 220B may authenticate the collaboration software application 222B using an authentication mechanism with the termination device 240. If the request fails authentication, the communication session may be terminated, for example, by the termination device 240.

The second sandbox container process may initiate a communication session with the termination device 240 using an authentication mechanism. The authentication procedure may use a predetermined protocol and may communicate with the termination device 240 using a predetermined communication port. As another example, the authentication procedure may be performed dynamically. For example, the authentication procedure used may depend on the network that the host computer system 212 is connected and/or the network that the termination device 240 is connected. As an example, the second sandbox container process may initiate the collaboration software application 222B and the communication session with the termination device 240 using an NT LAN Manager (NTLM) and the predetermined network port 2222. As another example, the second sandbox container process may initiate the communication session with the termination device 240 using a Secure Socket Layer (SSL) and the predetermined network port 2222. As part of the communication session, the second sandboxed computing environment 220B may send validation credentials to the termination device 240, for example, using a predetermined authentication mechanism. The predetermined authentication mechanism may be a username/password combination. The username/password combination may be encrypted, for example, with an asymmetric or a symmetric encryption key system. The termination device 240 may be the only device able to decrypt the username/password combination.

The second sandbox container process may be configured to authenticate with the termination device 240. For example, the second sandbox container process may authenticate with the termination device 240 on behalf of the collaboration software application 222B. The second sandbox container process may authenticate with the termination device 240 using credentials stored in a configuration file. The configuration file may be encrypted. For example, the second sandbox container process may be configured to read only encrypted configuration files.

Upon successful creation of a communication session between the second sandboxed computing environment 220B and the termination device 240, the termination device 240 may analyze and/or validate the request to interact with the one or more trusted or untrusted devices. If the request to interact with the trusted and/or untrusted devices is permitted, the termination device 240 may act as an intermediary communication point between the second sandboxed computing environment 220B and the trusted and/or untrusted devices.

A user may initiate a browser process and may enter and/or select a network destination. The host computer system 212 may initiate the browser process in the workspace 216 or the first sandboxed computing environment 220A. The host computer system 212 may determine whether the network destination is trusted or untrusted. The host computer system 212 may provide access to a trusted network destination via the browser process executed in the workspace 216. The host computer system 212 may provide access to an untrusted network destination via the browser process 222A executed in the first sandboxed computing environment 220A. For example, the first sandbox container process may be configured to spawn an instance of the browser process 222A in the first sandboxed computing environment 220A to provide access to the untrusted network destination.

As an example, the first sandbox container process may determine that a browser process operating in the workspace 216 is attempting to access an untrusted network destination. The first sandbox container process may spawn an instance of the browser process 222A in the first sandboxed computing environment 220A to provide access to the untrusted network destination. As an example, the first sandbox container process may determine that the browser process operating in the workspace 216 is attempting to access a trusted network destination. The first sandbox container process may allow the browser process operating in the workspace 216 to access the trusted network destination.

As another example, the first sandbox container process may determine that the browser process 222A operating in the first sandboxed computing environment 220A is attempting to access an untrusted network destination. The first sandbox container process may allow the browser process 222A operating in the first sandboxed computing environment 220A to access the untrusted network destination. As another example, the first sandbox container process may determine that the browser process 222A operating in the first sandboxed computing environment 220A is attempting to access a trusted network destination. The first sandbox container process may spawn an instance of a browser process in the workspace 216 to provide access to the trusted network destination.

The first sandboxed computing environment 220A and/or the second sandboxed computing environment 220B may receive malware from an untrusted network device. For example, the untrusted network device may send malware (e.g., malicious software) to the first sandboxed computing environment 220A or the second sandboxed computing environment 220B. The malware may be executed within the respective sandboxed computing environment. The executed malware may start one or more processes, download one or more payloads, and/or execute the one or more payloads. The processes and/or payloads may be executed within the respective sandboxed computing environment, for example, instead of on the workspace 216 of the operating system 226. The first and/or second sandboxed computing environments 220A, 220B may be considered infected when they have received malware.

Even when the first sandboxed computing environment 220A and/or the second sandboxed computing environment 220B are infected, the use of the sandbox based isolation may allow the host computer system 212 to be considered to be uninfected and trusted. The host computer system 212 may be considered uninfected and trusted because the memory spaces of the first sandboxed computing environment 220A (e.g., the second memory space) and the second sandboxed computing environment 220B (e.g., the third memory space) and the processes operating therein may be separated and isolated from the memory space for the workspace 216 (e.g., the first memory space) of the host computer system 212. The introduced malware may not be able to access the resources, assets, and/or files of the operating system 226. For example, the first and/or second internal isolation firewalls 218A, 218B may prevent the introduced malware from accessing the resources, assets, and/or files of the operating system 226. The trusted network 230 (e.g., to which the host computer system 212 is connected) may be deemed to be uninfected and trusted, for example, because the host computer system 212 is considered trusted and uninfected.

A sandboxed computing environment (e.g., such as sandboxed computing environments 220A, 220B) that becomes infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandboxed computing environment processes and/or its separated and isolated memory space. An infected sandboxed computing environment may be cleared (e.g., immediately) and reverted to its original, trusted condition. For example, one or more (e.g., all) aspects of the introduced malware may be removed from the infected sandboxed computing environment without any harm to the operating system 226. The sandbox container process may initiate a "clean slate" periodically, e.g., once a day, once every 12 hours, once an hour, etc. The sandbox container process may initiate a "clean slate" on demand, e.g., based on an indication and/or input received from the user of the host computer system 212. The "clean slate" may be initiated using a restore capability of the sandbox container process.

For example, the workspace 216 of the host computer system 212 may include at least one host monitoring process (e.g., such as the process monitoring capability 224B). The at least one host monitoring process may be configured to monitor the first and/or second sandboxed computing environments 220A, 220B and/or the first or second sandbox container processes. The at least one host monitoring process may be configured to restore the sandbox container processes to known good versions. The at least one host monitoring process may be configured to restore the sandbox container processes based on one or more of a user input, an application input, detection of an abnormality in the sandbox container process, or expiration of predetermined period of time (e.g., a timer-based refresh mechanism).

The host computer system 212 (e.g., the process monitoring capability 224B) may be configured to store a restore point of the first and/or second sandboxed computing environments 220A, 220B. The restore point may be associated with a configuration of the respective sandboxed computing environment. The host computer system 212 (e.g., an application or process operating within the workspace 216) may detect anomalous behavior within the first and/or second sandboxed computing environments 220A, 220B. The host computer system 212 may restore the first and/or second sandboxed computing environments 220A, 220B to the restore point, for example, based on detection of the anomalous behavior.

If malware on an infected sandboxed computing environment is able to access the resources, assets, and/or files of the operating system 226, the host computer system 212 may be considered infected and untrusted. For example, the malware may bypass the first and/or second internal isolation firewalls 218A, 281B via explicit user input. In an example, the other computer systems connected to the trusted network 230 may also be utilizing similar security and isolation systems as is described with respect to the host computer system 212. Even if one of the computers on the trusted network 230 is infected and transmits malware messages on the trusted network 230, the host-based firewall (e.g., such as the host-based firewall 214) configured on the other devices connected to the trusted network 230 may prohibit the introduced malware from communicating with/being passed to any other device on the trusted network 230. For example, the host-based firewall 214 may be configured to block incoming traffic from the trusted network 230. For example, the host-based firewall 214 may allow the host computer system 212 to send outgoing messages on the trusted network 230 (e.g., in order to reach certain trusted network locations), but the host-based firewall 214 may be configured to block incoming communications from the other devices connected to the trusted network 230. Thus, when an untrusted host computer system is connected to the trusted network 230, the trusted network 230 may remain uninfected and trusted, for example, even when other devices on the trusted network 230 become infected.

Malware may be introduced to the operating system 226 from a source other than communication with an untrusted network destination. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the sandbox container processes may be configured to prevent the processes and applications in the workspace 216 from being allowed to access untrusted resources (e.g., via the Internet 242), which may prevent malware introduced into the workspace 216 from communicating with its source or other devices. Further, the border firewall 238 may prevent the infected and/or untrusted host computer system from communicating with the Internet 242. For example, the border firewall 238 may be configured to block traffic to untrusted sources sent from the host computer system 212 unless the traffic originates from the first or second sandboxed computing environments 220A, 220B (e.g., and is routed through the network-based web proxy 236 or termination device 240, as described herein) and/or is explicitly permitted. Without a connection to (e.g., communication with) the Internet 242, the introduced malware may be prevented from performing many toolset functions from within the workspace 216 as described herein or any other function that an enslaved, infected and/or untrusted host computer system may perform. Without a connection to the Internet 242, the introduced malware may not be able to transfer any data from the infected and/or untrusted host computer system (e.g., the workspace 216) to the Internet 242.

An electronic mail (email) may be exchanged between the host computer system 212 and the Internet 242. For example, the trusted network 230 may include an intermediary email device (e.g., such as an email server, an email proxy, or the like) (not shown). The email may be sent and/or received by the host computer system 212 using an email application run on the operating system 226. The intermediary email device may be directly connected to the border firewall 238 and/or located within the trusted network 230.

The exchange of email between the host computer system 212 and the Internet 242 may be accomplished through a web browser application, for example, when the intermediary email device is not included in the trusted network 230. The exchange of email may be accomplished via the first or second sandboxed computing environments 220A, 220B.

The protection controls described herein (e.g., the host-based firewall 214 and/or the sandboxed computing environments 220A, 220B) may protect the host computer system 212 from malware as described herein.

One or more files may be exchanged between the host computer system 212 and untrusted network destinations, for example devices on the Internet 242. The files may be exchanged using an intermediary secure transfer device (e.g., such as a transfer server, a transfer appliance, and/or the like) (not shown). The intermediary secure transfer device may be located in the trusted network 230, for example, connected to the border firewall 238.

The host computer system 212 may exchange files to an untrusted network destination, for example a device on the Internet 242. The files may be transferred from the host computer system 212 and/or the device on the Internet 242 to the intermediary secure transfer device. A file transfer may be initiated from the host computer system 212 and/or from the device on the Internet 242. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the host computer system 212 to the intermediary secure transfer device.

The files received from the host computer system 212 may be transferred from the intermediary secure transfer device to an untrusted network device, for example a device on the Internet 242. The file transfer may be initiated from the device on the Internet 242. The file transfer may utilize an encrypted protocol via a predetermined network port. Authenticity of the device on the Internet 242 may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate the authenticity of the device on the Internet 242. Other encrypted protocol(s), network port(s), and/or authentication combination(s) may be employed for data transfers from the intermediary secure transfer device to a device on the Internet 242.

The files received from an untrusted network device, for example a device on the Internet 242 may be transferred from the intermediary secure transfer device to the host computer system 212. The file transfer may be initiated from the host computer system 212. The file transfer may utilize an encrypted protocol via a predetermined network port. Authenticity of the file(s) and/or the device may be validated, for example, prior to any data transfer.

When the host computer system 212 is connected to the trusted network 230, the host-based firewall 214 may implement a first configuration. When the host computer system 212 is connected to the untrusted network 232, the host-based firewall 214 may implement a second configuration. The first configuration may be associated with blocking incoming traffic to the host computer system 212 that does not come from one or more predefined devices and/or via one or more predefined ports. In the first configuration, the host-based firewall 214 may allow outgoing traffic to be sent from one or more processes or applications in the workspace 216, for example irrespective of the type of communication protocol used. In an example, the second configuration may be associated with preventing one or more applications and/or processes operating on the workspace 216 of the host computer system 212 from communicating with one or more untrusted destinations. In an example, the second configuration may be associated with blocking all incoming traffic from the untrusted network 232 to the host computer system 212.

When the host-based firewall 214 is configured in the second configuration, the host-based firewall 214 may allow one or more of the applications and/or process operating within the workspace 216 to communicate with a trusted network destination on condition that a predetermined set of communication protocols. The predetermined set of protocols may include communicating with the trusted network destination via a VPN client associated with the workspace 216. The trusted network destination may be located on the trusted network 230. The VPN client may be configured to establish an encrypted communication system with the trusted network destination via the untrusted network 232 and/or the Internet 242. For example, the second configuration of the host-based firewall 214 may enable one or more applications and/or processes operating within the workspace 216 to access the trusted network 230 via the untrusted network 232 and/or the Internet 242 using the VPN client.

In this manner, the host-based firewall 214 can allow the processes or applications of the workspace 216 to send outgoing communications without restriction when implementing the first configuration (e.g., when connected to the trusted LAN), but may limit outgoing communications, when implementing the second configuration (e.g., when connected to the untrusted LAN), to the processes or applications of the workspace 216 that are destined for trusted destinations and utilize a predetermined protocol in order to communicate with the trusted destination. In both the first and second configurations, the host-based firewall 214 may block incoming communications to the workspace 216 unless the communication is from a trusted destination and uses a predetermined communication protocol.

The host computer system 262 may be configured similarly to the host computer system 212. The host computer system 262 may include a host-based firewall 264 (e.g., such as the host-based firewall 214), an operating system 276 (e.g., such as the operating system 226), a first sandboxed computing environment 270A (e.g., such as the first sandboxed computing environment 220A), a second sandboxed computing environment 270B (e.g., such as the second sandboxed computing environment 220B), a first internal isolation firewall 268A (e.g., such as the first internal isolation firewall 218A), a second internal isolation firewall 268B (e.g., such as the second internal isolation firewall 218B), and a workspace 266 (e.g., such as the workspace 216). The host computer system 262 may be any host computer system, such as a personal computer (PC), a laptop, a virtual machine, and/or any of a variety of other host computer systems operatively connected with one or more user-accessible data entry devices, a display device viewable by a user, and a computer-accessible data storage. One or more application programs may run on the operating system 276.

The host computer systems 262 may include a sandbox-based internet isolation system. For example, the host computer system 262 may include one or more sandboxed computing environments (e.g., such as sandboxed computing environments 270A, 270B). In examples, a browser process 272A (e.g., a sandboxed browser process) may run within the first sandboxed computing environment 270A, and a collaboration software application 272B may run within the second sandboxed computing environment 270B. The sandboxed computing environments 270A, 270B may be untrusted portions operating on the host computer system 262. The host computer system 262 may include an anti-virus capability 274A, a process monitoring capability 274B, a document isolation capability 274C, and/or a malware Entrapt capability 274D. For example, the sandbox-based internet isolations system may include the anti-virus capability 274A, the process monitoring capability 274B, the document isolation capability 274C, and the malware Entrapt capability 274D, for example, in a single application and/or application suite.

The anti-virus capability 274A may be configured to prevent, detect, and/or remove malware from the host computer system 262. The anti-virus capability 274A may be based on one or more of signatures, machine learning, or behavioral learning (e.g., user and/or machine). For example, the anti-virus capability 274A may be configured to determine if a process and/or application operating on the host computer system 262 is harmful, malicious, and/or unauthorized based on predefined criteria (e.g., information) about process and/or application activity. As another example, the anti-virus capability 274A may analyze operation of the host computer system 262 and may modify (e.g., automatically) criteria used to determine if a process and/or application is harmful, malicious, and/or unauthorized. As another example, the anti-virus capability 274A may analyze interaction between the host computer system 262 and one or more users and may modify (e.g., automatically) criteria used to determine if a process and/or application is harmful, malicious, and/or unauthorized. The anti-virus capability 274A may modify the criteria based on the analysis of the operation of the host computer system 262 and/or based on the analysis of the interaction between the host computer system 262 and the one or more users. The criteria may be located locally to the host computer system 262, for example, within the workspace 266. The criteria may be located remotely to the host computer system 262. The criteria may be modified and/or updated periodically and/or by user request. The criteria may be modified based on data from the host computer system 262, user interaction, a separate computing device (e.g., such as a server), and/or a subscription methodology.

The process monitoring capability 274B may be configured to ensure that processes operating on the host computer system 262 are running and/or performing as intended. For example, the process monitoring capability 274B may be configured to monitor the sandboxed computing environments 270A, 270B and/or the respective sandbox container processes. The process monitoring capability 274B may be configured to restore the sandbox container processes to known good versions. The process monitoring capability 274B may be configured to restore the sandbox container processes based on one or more of a user input, an application input, detection of an abnormality in the sandbox container process, or expiration of predetermined period of time (e.g., a timer-based refresh mechanism).

The document isolation capability 274C may be configured to isolate sensitive, confidential, and/or proprietary data on the host computer system 262. The document isolation capability 274C may enable access to specific file types (e.g., regardless of file content—trusted or untrusted). Access to the sensitive, confidential, proprietary data, and/or configured file types may be isolated to a trusted environment of the host computer system 262. The trusted environment may be the operating system 276 and/or the workspace 266 of the host computer system 262. The document isolation capability 274C may be provided via untrusted memory space segregation.

The Entrapt capability 274D may be configured to use a sandbox internet isolation system to limit and/or segregate security threats. For example, the Entrapt capability 274D may include one or more isolated and segregate memory spaces (e.g., such as sandboxed computing environments 270A, 270B), one or more software based firewalls (e.g., such as internal isolation firewalls 268A, 268B), and/or browser switching.

The host computer system 262 may be configured to connect to the untrusted network 232. The host computer system 262 may be configured to access the trusted network 230, for example, via the untrusted network 232 and/or the Internet 242. For example, the host computer system 262 may access the trusted network 230 via a VPN connection. The VPN connection may enable the connectivity and features associated with a direct connection to the trusted network 230. The host computer system 262 may be configured to locally connect to the trusted network 230.

When the host computer system 262 is remotely connected to the trusted network 230, the first and/or second sandboxed computing environments 270A, 270B may be configured to send web traffic to untrusted network destinations via a web proxy. For example, when the host computer system 262 is connected to an untrusted network 232, the first and/or second sandboxed computing environments 270A, 270B may send the web traffic to the first internet-based web proxy 246 and/or the second internet-based web proxy 248. As an example, the first and/or second sandboxed computing environments 270A, 270B may be configured to use the same internet-based web proxy (e.g., such as the first internet-based web proxy 246) when the host computer system 262 is connected to the trusted network 230 or the untrusted network 232. As another example, the first and/or second sandboxed computing environments 270A, 270B may be configured to use the first internet-based web proxy 246 when the host computer system 262 is connected to a trusted network (e.g., such as trusted network 230) and may be configured to use the second internet-based web proxy 248 when the host computer system 262 is connected to an untrusted network (e.g., such as untrusted network 232). As another example, the first and/or second sandboxed computing environments 270A, 270B may be configured to use the first internet-based web proxy 246 and/or a network-based web proxy (e.g., such as the network-based web proxy 236) when the host computer system 262 is connected to a trusted network (e.g., such as the trusted network 230) and may be configured to use the second internet-based web proxy 248 when the host computer system 262 is connected to an untrusted network (e.g., such as the untrusted network 232). As another example, the first and/or second sandboxed computing environments 270A, 270B may be configured to use the network-based web proxy (e.g., such as the network-based web proxy 236) when the host computer system 262 is connected to an untrusted network (e.g., such as the untrusted network 232) with an encrypted connection channel (e.g., a VPN connection) to a trusted network (e.g., the trusted network 230) and may be configured to use one or more of the internet-based web proxies 246, 248 when connected to an untrusted network (e.g., such as the untrusted network 232) without an encrypted connection channel to a trusted network (e.g., trusted network 230).

Each of the sandboxed computing environments 270A, 270B may include resources (e.g., a limited set of resources) allocated to operation of respective sandbox container processes. For example, the first sandboxed computing environment 270A may be enforced via a first sandbox container process and the second sandboxed computing environment 270B may be enforced via a second sandbox container process. The first and second sandbox container processes may be security mechanisms used to separate resources associated with the respective sandboxed computing environments 270A, 270B from other applications and/or processes that may be running on the workspace 266 or other memory spaces of the host computer system 262. The first and second sandbox container processes may include security mechanisms used to separate resources associated with the first sandboxed computing environment 270A and applications and/or processes that may be running within the second sandboxed computing environment 270B (e.g., and vice versa). The sandboxed container processes may be configured to enable one or more applications and/or processes (e.g., such as a browser process, collaboration software, etc.) being executed within the respective sandboxed computing environments 270A, 270B to access the resources allocated for operation of the sandbox container processes. For example, the one or more applications and/or processes being operated within the first sandboxed computing environment 270A may be allowed to access memory associated with the first sandboxed computing environment 270A and one or more applications and/or processes being operated within the second sandboxed computing environment 270B may be allowed to access memory associated with the second sandboxed computing environment 270B. The memory associated with the first sandboxed computing environment 270A may be separate from memory that is configured to enable storage and operation of the workspace 266. The memory associated with the second sandboxed computing environment 270B may be separate from the memory that is configured to enable storage and operation of the workspace 266. The memory associated with the first sandboxed computing environment 270A may be separate from memory that is configured to enable storage and operation of the second sandboxed computing environment 270B.

The workspace 266 may include one or more processes operating within the operating system 276 that are not restricted by the first and second sandbox container processes. The operating system 276 of the host computer system may include a set of resources configured to enable operation of the workspace 266, the first sandbox container process, and/or the second sandbox container process.

The host computer system 262 may enable the host-based firewall 264. The host-based firewall 264 may prohibit communication (e.g., direct communication) between the host computer system 262 and other devices on the untrusted network 232. For example, the host-based firewall 214 may be configured to block incoming traffic to the trusted host computer system 262, except for traffic received via one or more predetermined devices and/or ports (e.g., via a VPN client connection).

The host-based firewall 264 may be implemented using software and/or hardware. For example, the host-based firewall 264 may be implemented using software that is commercially available, for example, such as Symantec Endpoint Protection, MacAfee Host Based Security Systems, etc. The host-based firewall 264 may be implemented using software inherent in the operating system 276 of the host computer system 262, for example the Windows operating system firewall. The host-based firewall 264 may be implemented using software for configuring and/or implementing restrictive ingress and/or egress policies on the host computer system 262.

FIG. 3 depicts an authentication matrix 300. A host computer system (e.g., such as the host computer systems 212, 262 shown in FIG. 2) may be configured to connect to a trusted network (e.g., such as the trusted network 230 shown in FIG. 2) and/or an untrusted network (e.g., the untrusted network 232 shown in FIG. 2). The host computer system may include a location awareness capability. For example, the host computer system may determine a type of network (e.g., trusted, untrusted, wired, wireless, cellular, etc.) to which it is connected and may analyze the connected network. The host computer system may dynamically adjust the security and/or authentication based on the determined type of network and/or the analysis of the connected network. For example, the host computer system may automatically implement a layer of security based on the determined type of network and/or the analysis of the connected network. A layer of security may include one or more policies per security feature. The host computer system may select one of a plurality of security layers. Analysis of the connected network may include determining whether a connected network is known and/or associated with a predetermined security policy configuration. When the connected network is known and/or associated with the predetermined security policy configuration, the host computer system may be configured to instantiate the predetermined security policy configuration. For example, the host computer system may be configured to instantiate one of a plurality of predetermined security policy configurations. When the connected network is not known and/or is not associated with a predetermined security policy configuration, the host computer system may instantiate a default security policy configuration. The default security policy configuration may require the most stringent security policy and/or authentication.

The host computer system may dynamically adjust one or more authentication methods and/or encryption schemes, for example, based on the determined type of network and/or the analysis of the connected network. The host computer system may implement (e.g., automatically) an authentication mechanism and/or an encryption scheme based on one or more of a level of protection required, the type of network (e.g., trusted or untrusted), a unique local area network addressing, a location of the authenticating device, a location of an intermediate device (e.g., such as a web proxy), a type of communication attempted (e.g., such as web-based protocols, a file transfer, etc.), and/or a type of devices being used for communication (e.g., windows-based, Mac-based, and/or Linux-based).

The authentication mechanisms and/or encryption schemes may include username/password, two factor authentication (TFA), shared keys, certificate-based, NT Lan Manager (NTLM), and/or Kerberos. As shown in FIG. 3, a level 1 authentication may include NTLM, Kerberos, username/password, TFA, certificate-based, and/or shared keys authentication. A level 2 authentication may include TFA, certificate-based, and/or shared keys authentication. A level 3 authentication may include TFA and/or certificate-based authentication. A level 4 authentication may include TFA authentication.

A host computer system connected to a trusted network may determine to use a level 1 authentication with a termination device on the trusted network. A host computer system connected to a trusted network may determine to use a level 2 authentication with a termination device on an untrusted network. A host computer system connected to an untrusted network may determine to use a level 3 authentication with a termination device on a trusted network. A host computer system connected to an untrusted network may determine to use a level 4 authentication with a termination device on an untrusted network.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:
1. A host computer comprising:
a memory; and
a processor configured to:
  implement a workspace, the workspace being configured to enable operation of a first set of one or more applications or processes via a first memory space;
  implement an isolated computing environment, the isolated computing environment comprising a sandboxed computing environment being configured to enable operation of a second set of one or more applications or processes via a second memory space;
  isolate the isolated computing environment from the workspace using an internal isolation firewall;
  process communications exchanged between the host computer and a network to which the host computer is connected using a host-based firewall, wherein the host-based firewall is configured to implement a first policy for communications associated with the isolated computing environment and a second policy for communications associated with the workspace;
  determine a relative location of the host computer;
  select an authentication procedure for authenticating the isolated computing environment with a server based on the determined relative location of the host computer; and
  authenticate the isolated computing environment with the server in accordance with the selected authentication procedure.

2. The host computer of claim 1, wherein the relative location of the host computer is determined based on whether the network that the host computer is connected to is a predetermined trusted network.

3. The host computer of claim 1, wherein the second policy implemented by the host-based firewall is based on the relative location of the host computer, wherein:
  the second policy allows an outgoing communication from the first set of one or more applications associated with the workspace to the network on condition that the network is determined to be a predetermined trusted network, and
  the second policy blocks the outgoing communication from the first set of one or more applications associated with the workspace to the network on a condition that the network is determined not to be the predetermined trusted network.

4. The host computer of claim 1, wherein a first authentication procedure is selected if the network is a predetermined trusted network and a second authentication procedure is selected if the network is not the predetermined trusted network, wherein the server is accessed using a first network address when using the first authentication procedure and the server is accessed using a second network address when using the second authentication procedure.

5. The host computer of claim 4, wherein the first authentication procedure utilizes a username/password authentication, and the second authentication procedure utilizes one or more of a NT LAN manager (NTLM) authentication, a KERBEROS authentication, a certificate-based authentication, a shared keys authentication, a two-factor authentication (TFA), a biometric authentication, a behavioral authentication, a secure socket layer (SSL) authentication, and a MAC address authentication.

6. The host computer of claim 1, wherein a first authentication procedure is selected if the network is a predetermined trusted network, the first authentication procedure utilizing one or more of a username/password authentication, a NT LAN manager (NTLM) authentication, a KERBEROS authentication, a certificate-based authentication, a shared keys authentication, a two-factor authentication (TFA), a biometric authentication, a behavioral authentication, a secure socket layer (SSL) authentication, and a MAC address authentication, and wherein a second authentication procedure is selected if the network is not the predetermined trusted network, the second authentication procedure utilizing one or more of the username/password authentication, the NTLM authentication, the KERBEROS authentication, the certificate-based authentication, the shared keys authentication, the TFA, the biometric authentication, the behavioral authentication, the SSL authentication, and the MAC address authentication that the first authentication procedure is not utilizing.

7. The host computer of claim 1, wherein the second set of one or more applications or processes associated with the isolated computing environment are prevented from communicating with an untrusted network destination prior to authenticating with the server, and the second set of one or more applications or processes associated with the isolated computing environment are allowed to communicate with the untrusted network destination after authenticating with the server.

8. The host computer of claim 7, wherein the isolated computing environment is configured to classify a network destination as trusted or untrusted based on one or more whitelist comprising a list of trusted network destinations or a blacklist comprising a list of untrusted network destinations.

9. The host computer of claim 1, wherein determining the relative location of the host computer comprises one or more of determining a unique local area networking address of the network the host computer is connected to, determining a network identification of the network the host computer is connected to, using a global position system (GPS) technique, determining a MAC address of at least one device on the network that the host computer is connected to, and determining that the host computer has connectivity with one or more known devices on the network.

10. A server, the server comprising:
a memory; and
a processor configured to send one or more downloadable executable files to a host computer, wherein when the one or more downloadable executable files run on the host computer, the one or more downloadable executable files configure the host computer to:
  implement a workspace, the workspace being configured to enable operation of a first set of one or more applications or processes via a first memory space;
  implement an isolated computing environment, the isolated computing environment comprising a sandboxed computing environment being configured to enable operation of a second set of one or more applications or processes via a second memory space;
  isolate the isolated computing environment from the workspace using an internal isolation firewall;
  process communications exchanged between the host computer and a network to which the host computer is connected using a host-based firewall, wherein the host-based firewall is configured to implement a first policy for communications associated with the isolated computing environment and a second policy for communications associated with the workspace;
  determine a relative location of the host computer;
  select an authentication procedure for authenticating the isolated computing environment with an authentication server based on the determined relative location of the host computer; and
  authenticate the isolated computing environment with the authentication server in accordance with the selected authentication procedure.

11. The server of claim 10, wherein the relative location of the host computer is determined based on the network that the host computer is connected to and based on whether the network to which the host computer is connected is a predetermined trusted network.

12. The server of claim 10, wherein the second policy implemented by the host-based firewall is based on the relative location of the host computer, wherein:
the second policy allows an outgoing communication from the first set of one or more applications associated with the workspace to the network on condition that the network is determined to be a predetermined trusted network, and
the second policy blocks the outgoing communication from the first set of one or more applications associated with the workspace to the network on a condition that the network is determined not to be the predetermined trusted network.

13. The server of claim 10, wherein a first authentication procedure is selected if the network is a predetermined trusted network and a second authentication procedure is selected if the network is not a predetermined trusted network, wherein the authentication server is accessed using a first network address when using the first authentication procedure and the at least one authentication server is accessed using a second network address when using the second authentication procedure.

14. The server of claim 13, wherein the first authentication procedure utilizes username/password authentication and the second authentication procedure utilizes one or more of a NT LAN manager (NTLM) authentication, a KERBEROS authentication, a certificate-based authentication, a shared keys authentication, a two-factor authentication (TFA), a biometric authentication, a behavioral authentication, a secure socket layer (SSL) authentication, and a MAC address authentication.

15. The server of claim 10, wherein a first authentication procedure is selected if the network is a predetermined trusted network, the first authentication procedure utilizing one or more of a username/password authentication, a NT LAN manager (NTLM) authentication, a KERBEROS authentication, a certificate-based authentication, a shared keys authentication, a two-factor authentication (TFA), a biometric authentication, a behavioral authentication, a secure socket layer (SSL) authentication, and a MAC address authentication, and wherein a second authentication procedure is selected if the network is not the predetermined trusted network, the second authentication procedure utilizing one or more of the username/password authentication, the NTLM authentication, the KERBEROS authentication, the certificate-based authentication, the shared keys authentication, the TFA, the biometric authentication, the behavioral authentication, the SSL authentication, and the MAC address authentication that the first authentication procedure is not utilizing.

16. The server of claim 10, wherein the second set of one or more applications or processes associated with the isolated computing environment are prevented from communicating with an untrusted network destination prior to authenticating with the authentication server, and the second set of one or more applications or processes associated with the isolated computing environment are allowed to communicate with the untrusted network destination after authenticating with the authentication server.

17. The server of claim 16, wherein the isolated computing environment is configured to classify a network destination as trusted or untrusted based on one or more of a whitelist comprising a list of trusted network destinations and a blacklist comprising a list of untrusted network destinations.

18. The server of claim 10, wherein determining the relative location of the host computer comprises one or more of determining a unique local area networking address of the network the host computer is connected to, determining a network identification of the network the host computer is connected to, using a global position system (GPS) technique, determining a MAC address of a device on the network that the host computer is connected to, and determining that the host computer has connectivity with one or more known devices on the network.

19. A method for authenticating a communication between a host computer and a network, the method comprising:
   implementing a workspace, the workspace being configured to enable operation of a first set of one or more applications or processes via a first memory space;
   implementing an isolated computing environment, the isolated computing environment comprising a sandboxed computing environment being configured to enable operation of a second set of one or more applications or processes via a second memory space;
   isolating the isolated computing environment from the workspace using an internal isolation firewall;
   processing communications exchanged between the host computer and a network to which the host computer is connected using a host-based firewall, wherein the host-based firewall is configured to implement a first policy for communications associated with the isolated computing environment and a second policy for communications associated with the workspace;
   determining a relative location of the host computer;
   selecting an authentication procedure for authenticating the isolated computing environment with a server based on the determined relative location of the host computer; and
   authenticating the isolated computing environment with the server in accordance with the selected authentication procedure.

20. The method of claim 19, wherein the second set of one or more applications or processes associated with the isolated computing environment are prevented from communicating with an untrusted destination prior to authenticating with the server, and the second set of one or more applications or processes associated with the isolated computing environment are allowed to communicate with the untrusted destination after authenticating with the server.

* * * * *